United States Patent
Han

(10) Patent No.: US 7,885,327 B2
(45) Date of Patent: Feb. 8, 2011

(54) VIDEO CODING AND DECODING METHODS WITH HIERARCHICAL TEMPORAL FILTERING STRUCTURE, AND APPARATUS FOR THE SAME

(75) Inventor: Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1394 days.

(21) Appl. No.: 11/353,130

(22) Filed: Feb. 14, 2006

(65) Prior Publication Data

US 2006/0182179 A1 Aug. 17, 2006

Related U.S. Application Data

(60) Provisional application No. 60/652,002, filed on Feb. 14, 2005.

(30) Foreign Application Priority Data

Apr. 13, 2005 (KR) ...................... 10-2005-0030730

(51) Int. Cl.
- *H04B 1/66* (2006.01)
- *H04N 7/12* (2006.01)
- *H04N 11/02* (2006.01)
- *H04N 11/04* (2006.01)

(52) U.S. Cl. .......................... 375/240.12; 375/240.01; 375/240.03; 375/240.15; 375/240.16

(58) Field of Classification Search ............ 375/240.12, 375/240.01, 240.03, 240.15, 240.16
See application file for complete search history.

(56) References Cited

U.S. PATENT DOCUMENTS

| 5,502,510 | A | 3/1996 | Kim et al. |
| RE36,507 | E | 1/2000 | Iu |
| 6,016,162 | A | 1/2000 | Odaka et al. |
| 2002/0110194 | A1 | 8/2002 | Bottreau |
| 2005/0013365 | A1 | 1/2005 | Mukerjee et al. |
| 2005/0157793 | A1* | 7/2005 | Ha et al. ................ 375/240.16 |
| 2006/0182179 | A1* | 8/2006 | Han ..................... 375/240.16 |
| 2006/0182315 | A1* | 8/2006 | Cha ......................... 382/107 |

FOREIGN PATENT DOCUMENTS

| KR | 10-2004-0062840 A | 7/2004 |
| KR | 10-2004-0106417 A | 12/2004 |
| KR | 10-2004-0106418 A | 12/2004 |

OTHER PUBLICATIONS

Woo-Jin Han, "Successive Temporal Approximation and Referencing (STAR) for improving MCTF in Low End-to-end Delay Scalable Video Coding," Digital Media R&D Center, Samsung Electronics, Korea, Dec. 2003, pp. 1-26.

* cited by examiner

*Primary Examiner*—Ted M Wang
(74) *Attorney, Agent, or Firm*—Sughrue Mion, PLLC

(57) ABSTRACT

A method and apparatus for video coding and decoding with hierarchical temporal filtering structure are disclosed. A video encoding method in a temporal level having a hierarchical temporal filtering structure, includes generating prediction frames from two or more reference frames that temporally precede the current frame; generating a residual frame by subtracting the prediction frames from the current frame; and encoding and transmitting the residual frame.

7 Claims, 8 Drawing Sheets

VIDEO CODING AND DECODING METHODS WITH HIERARCHICAL TEMPORAL FILTERING STRUCTURE, AND APPARATUS FOR THE SAME

CROSS-REFERENCE TO RELATED APPLICATIONS

This application claims priority from Korean Patent Application No. 10-2005-0030730 filed on Apr. 13, 2005 in the Korean Intellectual Property Office, and U.S. Provisional Patent Application No. 60/652,002 filed on Feb. 14, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate to video coding and decoding, and more particularly, to video coding and decoding enabling efficient video coding and decoding even when a backward reference path is not permitted because of a low-delay condition, by conducting temporal prediction using the hierarchical temporal filtering method with two or more temporally preceding frames as reference frames.

2. Description of the Related Art

Development of communication technologies including the Internet has led to an increase in video communications in addition to text and voice communications. However, consumers have not been satisfied with existing text-based communication schemes. To satisfy consumer demand, multimedia data containing a variety of information including text, images, music and the like has been increasingly provided. Multimedia data is usually voluminous and it therefore requires a large capacity storage medium. Also, a wide bandwidth is required for transmitting the multimedia data. Under these circumstances, it is necessary to use a compressed coding scheme when transmitting multimedia data.

A basic principle of data compression is to eliminate redundancy in the data. There are three types of data redundancy: spatial, temporal, and perceptual/visual. Spatial redundancy refers to the duplication of identical colors or objects in an image, temporal redundancy refers to little or no variation between neighboring frames in a moving picture frame or successive repetition of the same sound in audio, and perceptual/visual redundancy refers to human inability to perceive high frequencies. By eliminating these redundancies, data can be compressed. Motion compensation-based temporal prediction, a general video coding method, eliminates temporal redundancy.

In temporal prediction, a prediction frame for a current frame to be compressed is generated from one or more neighboring frames, and a residual signal is obtained by subtracting the prediction frame from the current frame. According to temporal levels of a reference frame, temporal prediction is classified into forward prediction, backward prediction, and bi-directional prediction. Forward prediction makes a prediction using a frame that is temporally earlier than the current frame as a reference frame, backward prediction makes a prediction using a frame that is temporally later than the current frame as a reference frame, and bi-directional prediction makes a prediction using a frame that is temporally earlier than the current frame and a frame that is temporally later than the current frame as reference frames.

Among temporal prediction techniques used in the current video coding system, a common one is a temporal filtering method having a hierarchical structure, which conducts temporal prediction based on motion compensation. Bi-directional prediction is a commonly used temporal prediction technique, and it is an important technique for realizing higher coding efficiency.

However, when a backward reference path is restricted because of a low-delay condition, the video coding performance is degraded. Thus, there is a demand for a method to enable temporal prediction by referencing two or more frames even when backward prediction is restricted in temporal prediction by hierarchical temporal filtering.

SUMMARY OF THE INVENTION

The present invention provides video coding and decoding methods enabling bi-directional prediction by using a forward frame already processed as a reference frame, instead of a missing backward reference frame, even when a backward prediction path is not permitted under a low-delay condition.

The present invention also provides video coding and decoding methods enabling forward prediction using a plurality of forward reference frames, by using a forward frame already processed as a reference frame.

The present invention also provides video coding and decoding methods enabling reduction of drift artifacts of a video encoder using an open loop, by using temporally preceding frames as reference frames.

According to an aspect of the present invention, there is provided a video encoding method in a temporal level having a hierarchical temporal filtering structure, the method comprising generating prediction frames from two or more reference frames that temporally precede the current frame; generating a residual frame by subtracting the prediction frames from the current frame; and encoding and transmitting the residual frame.

According to another aspect of the present invention, there is provided a video decoding method in a temporal level having a hierarchical temporal filtering structure, the method comprising extracting a reference frame number and texture data from a bitstream; inversely quantizing the texture data; restoring a residual frame by conducting inverse spatial transformation on the inversely quantized texture data; generating a prediction frame with the reference frame corresponding to the reference frame number; and restoring a video frame by adding the residual frame to the prediction frame, wherein the reference frame number refers to the numbers of two or more frames temporally preceding the video frame.

According to another aspect of the present invention, there is provided a video encoder in a temporal level having the hierarchical temporal filtering structure, the encoder comprising a temporal transform unit to eliminate the temporal redundancy of a residual frame that subtracts from the current frame a prediction frame generated from two or more frames temporally preceding the current frame; a spatial transform unit to eliminate the spatial redundancy of the residual frame whose temporal redundancy has been eliminated; a quantization unit to quantize a transform coefficient supplied by the spatial transform unit; and an entropy encoding unit to encode the quantized transform coefficient.

According to another aspect of the present invention, there is provided a video decoder in a temporal level having a hierarchical temporal filtering structure, the decoder comprising: an entropy decoding unit to extract a reference frame number and texture data from a bitstream; an inverse quantization unit to inversely quantize the texture data; an inverse spatial transform unit to reconstruct a residual frame by inversely conducting a spatial transformation on the inversely quantized texture data; a motion compensation unit to conduct motion compensation on a frame corresponding to the reference frame number; and a prediction frame generation unit to generate a prediction frame from the motion compensated frame, wherein the reference frame number refers to the numbers of two or more frames temporally preceding the video frame.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF EXEMPLARY EMBODIMENTS

Figure 1:
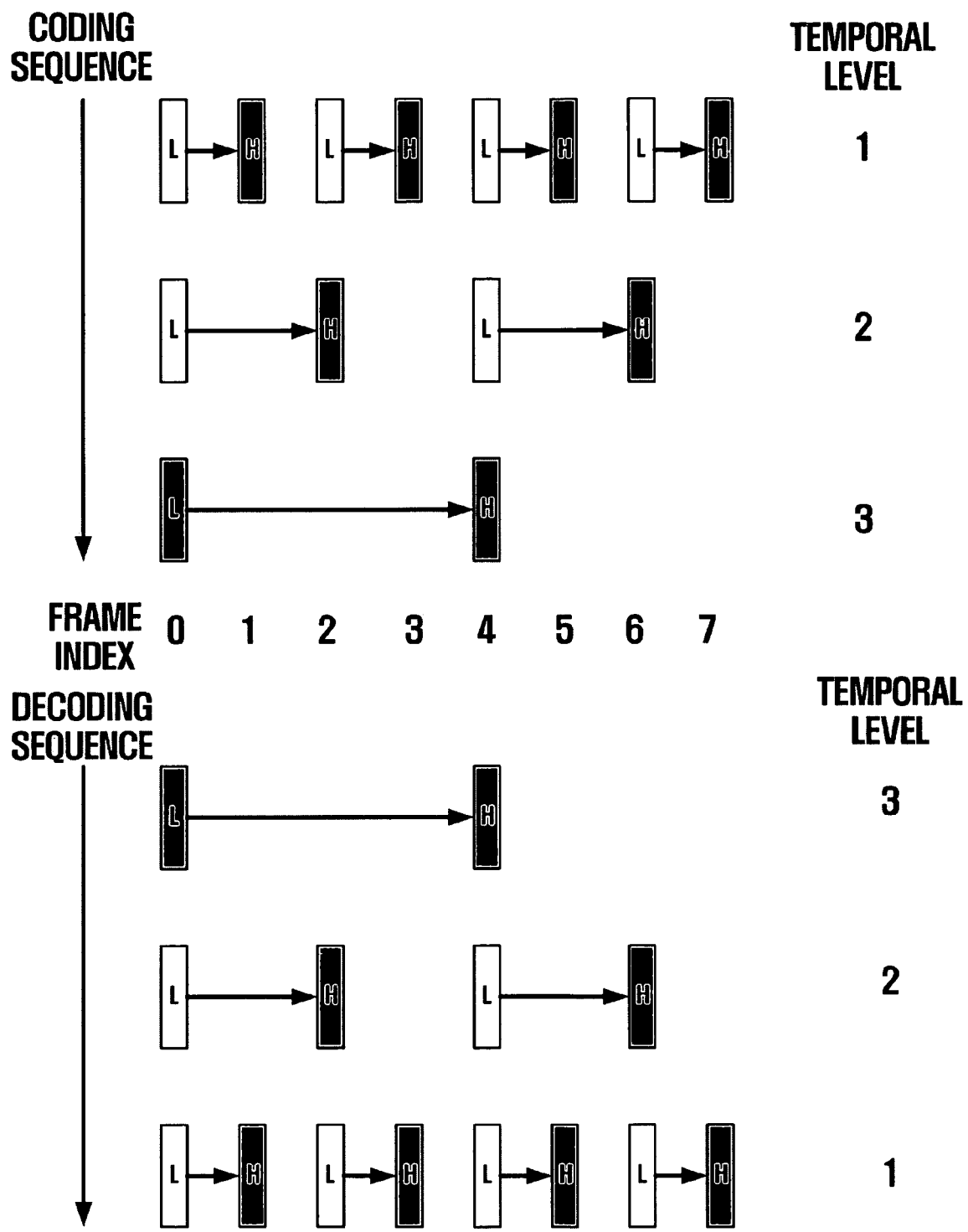
FIG. 1 illustrates scalable video coding and decoding using a motion compensated temporal filtering (MCTF) mechanism.

Hereinbelow, exemplary embodiments of the present invention will be described in detail with reference to the accompanying drawings. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will be described in detail with reference to the accompanying drawings.

Hierarchical temporal filtering refers to a method to hierarchically eliminate temporal redundancy using several temporal levels. Motion compensated temporal filtering (MCTF) proposed by Ohm and improved by Choi and Wood, among hierarchical temporal filtering techniques, is a core technology for temporally flexible scalable video coding.

FIG. 1 illustrates video coding and decoding using an MCTF mechanism.

In FIG. 1, an L frame refers to a low-pass or average frame, and an H frame refers to a high-pass or difference frame. As illustrated, coding is first carried out by temporally filtering frame pairs at a low temporal level, converting low level frames into L frames and H frames at a high temporal level, temporally filtering again converted L frame pairs and converting them into frames at a higher temporal level.

An encoder generates a bitstream through wavelet transformation by use of a single L frame and H frames at the highest temporal level. In this figure, frames indicated with a darker color refer to frames targeted for the wavelet transformation. Coding is conducted in the sequence from low level to high level.

A decoder decodes darker-colored frames, after they pass through the inverse wavelet transform, in the sequence from high level to low level, to thereby reconstruct the frames. In other words, two L frames of the second temporal level are reconstructed by use of an L frame and an H frame of the third temporal level, four L frames of the first temporal level are reconstructed by use of two L frames and two H frames of the second temporal level. Finally, eight frames are reconstructed by use of four L frames and four H frames of the first temporal level.

In the MCTF mechanism, temporal wavelet transformation of a frame is conducted by employing prediction and updating. Many wavelet filters may be used, but it is known that a 5/3 filter exhibits the best performance.

Figure 2:
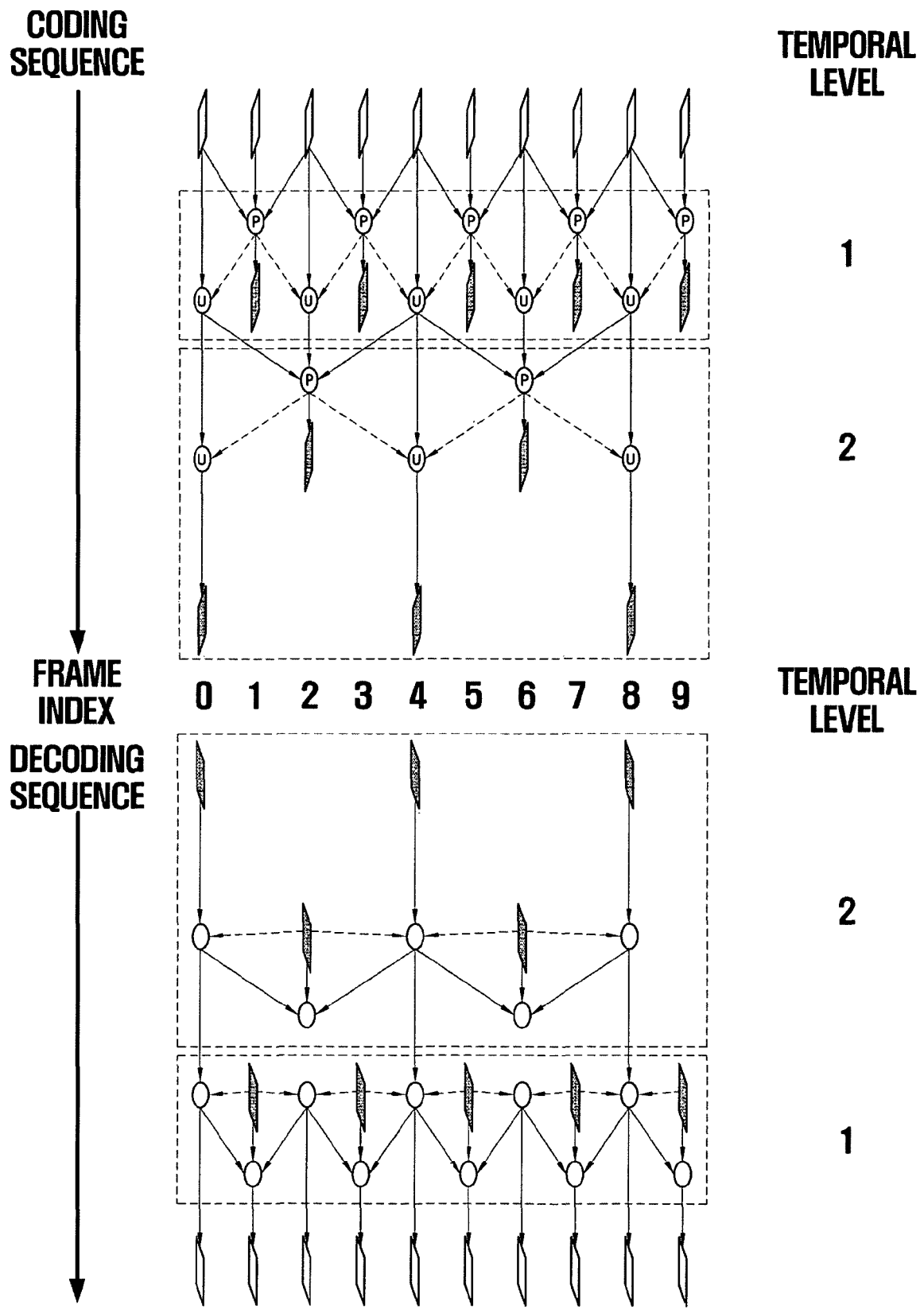
FIG. 2 illustrates scalable video coding and decoding using an MCTF mechanism by means of a 5/3 filter.

FIG. 2 illustrates video coding and decoding using an MCTF mechanism, by means of a 5/3 filter.

The concept of the 5/3 MCTF filter for a group of pictures (GOP) having 10 frame sizes is illustrated in FIG. 2. In the prediction operation ("p" in FIG. 2), frames are predicted from the nearest neighboring frames. That is, a prediction frame for a current frame is predicted as: ½*forward neighboring frame+½*backward neighboring frame. Accordingly, a high-pass frame subtracting the prediction frame from the current frame is generated. In the update operation ("u" in FIG. 2), reference frames are temporally filtered in order to prevent aliasing due to sub-sampling.

As other examples of the hierarchical temporal filtering structure, there are several methods to improve the MCTF mechanism described above. One of them is the successive temporal approximation and reference (STAR) algorithm. The STAR algorithm was first disclosed in a paper entitled "Successive Temporal Approximation and Referencing (STAR) for Improving MCTF in Low End-to-End Delay Scalable Video Coding" published in ISO/IEC JTC 1/SC 29/WG11 in December 2003 by Woo-jin Han, who is also the inventor of the present invention.

Figure 3:
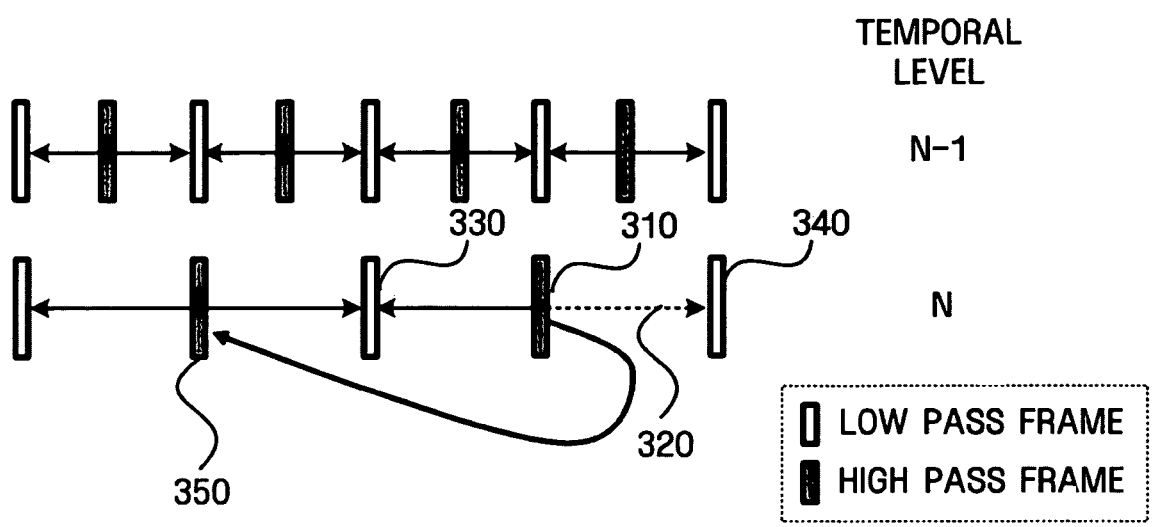
FIG. 3 illustrates a concept of bi-directional prediction using a forward frame according to an exemplary embodiment of the present invention.

FIG. 3 illustrates a concept of prediction using a plurality of forward frames according to an exemplary embodiment of the present invention.

In the MCTF framework, bi-directional prediction is used via a 5/3 filter mechanism, as described above in connection with FIG. 2. However, in the conventional MCTF approach, forward prediction and update operations may be restricted because of a low-delay condition. The low-delay condition is to restrict the delay time between a terminal of an encoder and a terminal of a decoder so as not to exceed a predetermined time in video compression. The low-delay condition is a restriction required in real-time applications, such as real-time broadcasting that requires a low final delay time. Thus, when the temporal length of a backward reference path exceeds the time permitted under the low-delay condition, the concerned backward reference is restricted in the temporal filtering operation.

In the present exemplary embodiment, the backward reference frame, whose referencing is restricted, is replaced with one of already processed frames at the same temporal level, thereby enabling bi-directional prediction, and further plural forward reference predictions. A theoretical ground to use the already processed forward frame instead of the backward reference frame as a reference frame according to this exemplary embodiment lies in the fact that many regions in neighboring frames slowly change. Thus, it may be a reasonable choice to use the nearest forward frame as a new frame in the low-delay condition. Further, as the draft effect in the open loop MCTF process is less severe in the temporally preceding frames, use of the already processed frame can reduce draft artifacts in the low-delay condition.

A prediction method using two or more forward reference frames according to this exemplary embodiment may be accomplished by adding the already processed nearest frame at the same temporal level to the backward reference list L1. In the conventional MCTF process having no low-delay condition, a backward reference frame index bi is derived as in Equation 1.

$$bi\ (tlevel) = ci\ (tlevel) + 1, \qquad \text{Equation 1}$$

where ci refers to an index of the current frame, tlevel refers to a temporal level of the current frame. However, when a reference path to the backward reference frame violates the low-delay condition, the backward reference frame index may be modified as in Equation 2.

$$bi\ (tlevel) = \max(ci\ (tlevel) - k, 0), \qquad \text{Equation 2}$$

where k refers to an integer value equal to or larger than 2. The max operator is used in order to guarantee that the backward reference frame index bi is 0 or a positive value.

A prediction method using a plurality of forward reference frames according to an exemplary embodiment of the present invention will be described in detail with reference to FIG. 3.

In the prediction method using a plurality of forward reference frames according to the present exemplary embodiment, bi-directional prediction is conducted using a forward frame 330 and a backward frame 340 of the current frame when the low-delay condition is satisfied. However, since the backward reference path 320 is not permitted when the low-delay condition is not satisfied, conversion to enable the bi-directional prediction may be conducted using the already-processed nearest frame 350 among the forward frames of the current frame 310.

In the hierarchical temporal filtering structure using bi-directional prediction according to another exemplary embodiment of the present invention, the bi-directional prediction may be implemented using a plurality of forward frames.

In a further exemplary embodiment of the present invention, a method of consuming the minimum cost may be selected, among the prediction using only the forward frame 330, the prediction using only the already processed forward frame 350 to replace the backward reference frame, and the bi-directional prediction using both frames 330 and 350. Among these three prediction methods, the most advantageous method having the lowest cost is selected. Here, the cost C may be determined by several methods. Typically, it is calculated as in Equation 3, which is based on a rate-distortion function where E refers to the difference between a signal reconstructed by decoding the encoded bit and the original signal, and B refers to the bits consumed in conducting each method. In addition, $\lambda$ is a Lagrangian coefficient that is capable of controlling reflection rates of E and B.

$$C = E + \lambda B. \qquad \text{Equation 3}$$

The present invention has been described so far by focusing on the prediction method conducted with two reference frames. However, it should be obvious to those skilled in the art that the present invention may be extended to cover predictions conducted by referencing two or more reference frames.

Figure 4:
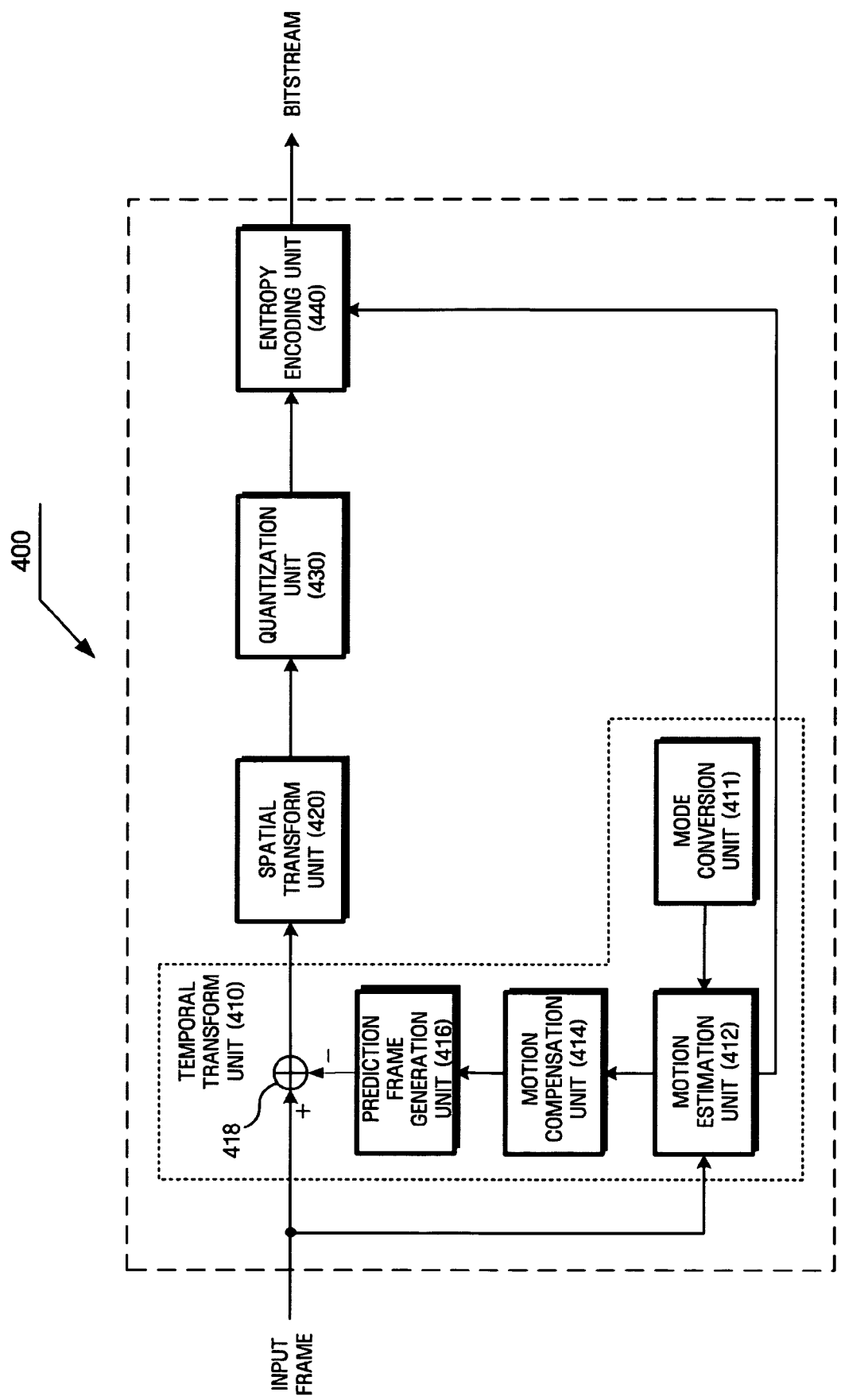
FIG. 4 is a block diagram illustrating a construction of a video encoder according to an exemplary embodiment of the present invention.

FIG. 4 is a block diagram illustrating a construction of a video encoder according to an exemplary embodiment of the present invention.

The video encoder 400 comprises a temporal transform unit 410, a spatial transform unit 430, a quantization unit 430 and an entropy encoding unit 440. The temporal transform unit 410 is further divided into a mode conversion unit 411, a motion estimation unit 412, a motion compensation unit 414 and a prediction frame generation unit 416.

The mode conversion unit 411 determines whether the low-delay condition is met. When the backward reference does not violate the low-delay condition, the bi-directional prediction is conducted using the forward frame and the backward frame of the current frame, as in the conventional bi-directional prediction. Conversely, when the backward reference violates the low-delay condition, the bi-directional prediction using two forward frames is conducted by using the nearest already-processed frame among the forward frames of the current frame, instead of the backward reference frame whose referencing is restricted. However, irrespective of the low-delay condition, the mode conversion unit 411 may be omitted in the video encoder that conducts the bi-directional prediction using two forward frames of the current frame.

The motion estimation unit 412 conducts motion estimation of the current frame based on a reference frame and obtains a motion vector. An algorithm widely used for this motion estimation is the block matching algorithm. The displacement having the minimum error while a given motion block moves (in pixel units) within a specific search area of a reference frame is presumed as a motion vector. A motion block of a fixed size is used for the motion estimation, but a motion block of a variable size may also be used for the motion estimation according to the hierarchical variable size block matching (HVSBM) algorithm. The motion estimation unit 412 receives information on a prediction method from the mode conversion unit 411 according to whether the low-delay condition is violated, and supplies the entropy encoding unit 440 with a motion vector obtained as a result of the motion estimation, and motion data such as the size of a motion block, a reference frame number.

The motion compensation unit 414 reduces temporal redundancy of the input video frame. In this case, the motion compensation unit 414 conducts motion compensation for a reference frame by use of a motion vector calculated by the motion estimation unit 412, and then supplies the motion compensated frame to the prediction frame generation unit 416.

The prediction frame generation unit 416 obtains weighted averages of the motion compensated reference frames supplied from the motion compensation unit 414 to thereby generate a temporal prediction frame, and supplies a subtracter 418 with the generated prediction frame. When there are two reference frames, the weighted values of the two reference frames may be identical, or they may be inversely proportional to a temporal position distant from the current frame. This may be the same as in the case where there are more than two reference frames.

The subtracter 418 subtracts the temporal prediction frame from the current frame to thereby eliminate the temporal redundancy of the video.

The spatial transform unit 420 eliminates spatial redundancy from the frame whose temporal redundancy has been eliminated by the subtracter 418 by use of the spatial transform method. As the spatial transform method, the discrete cosine transform (DCT) or wavelet transform are mainly used. Coefficients obtained as a result of conducting the spatial transform are called transform coefficients. When the DCT is used, the coefficient is called a DCT coefficient. When the wavelet transform is used, it is called a wavelet coefficient.

The quantization unit 430 quantizes the transform coefficient produced by the spatial transform unit 420. Quantization implies a job to indicate the transform coefficient expressed as a random real number value as discrete values by dividing it into fixed sections and matching them with predetermined indices. Especially, when the wavelet transform is used as the spatial transform method, an embedded quantization method is often used as the quantization method. The embedded quantization method preferentially encodes components in excess of a threshold value by changing the threshold value of the transform coefficient (by ½); effective quantization is performed using spatial redundancy. The embedded zerotrees wavelet (EZW) algorithm, set partitioning in hierarchical trees (SPIHT), embedded zeroblock coding (EZBC) and others can be used as the embedded quantization method.

The entropy encoding unit 440 losslessly encodes the transform coefficient quantized by the quantization unit 430 and motion data supplied by the motion estimation unit 412, and generates an output bitstream. Arithmetic coding and variable length coding may be used as the lossless encoding method.

Figure 5:
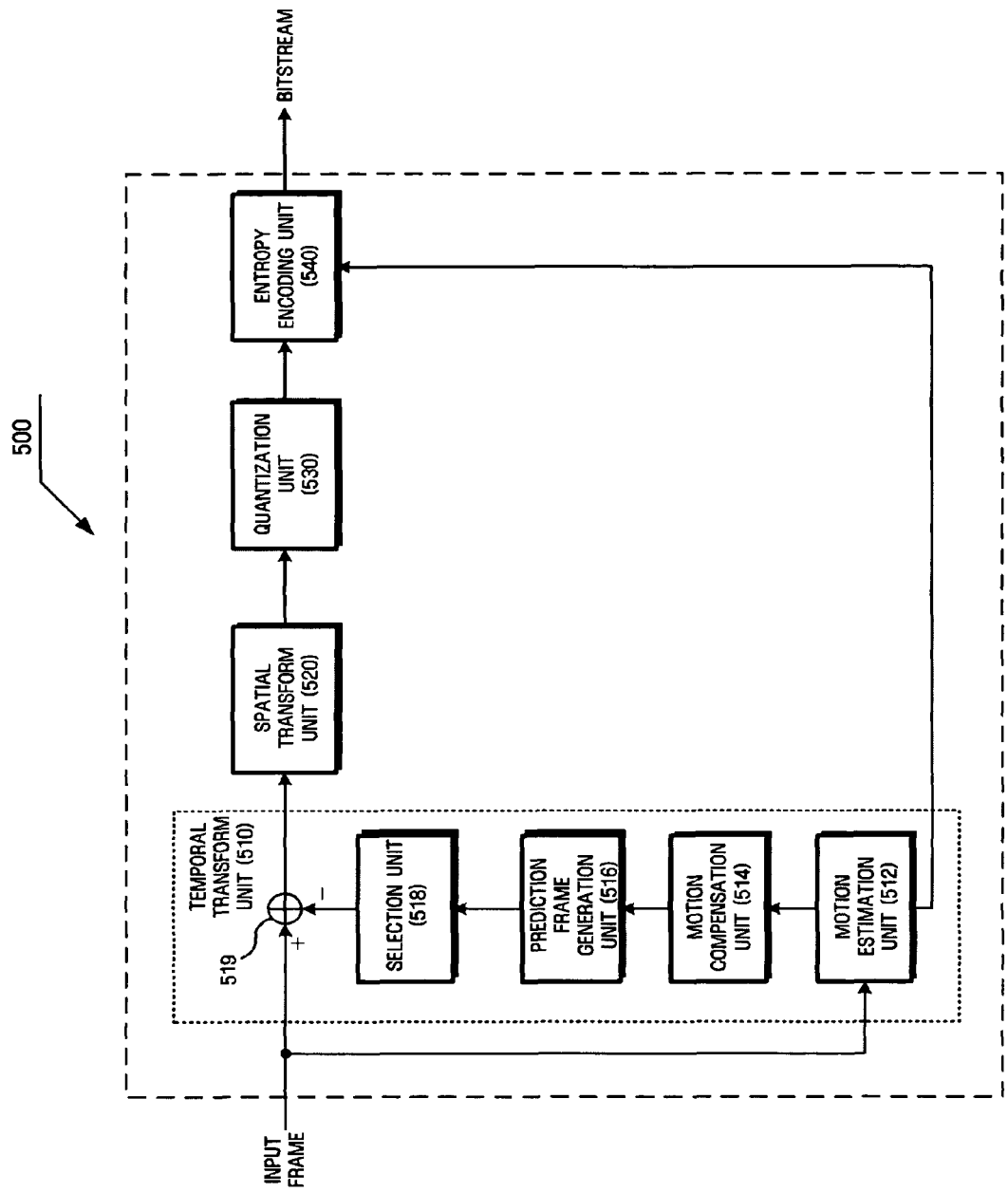
FIG. 5 is a block diagram illustrating a construction of a video encoder according to another exemplary embodiment of the present invention.

FIG. 5 is a block diagram illustrating a construction of a video encoder according to another exemplary embodiment of the present invention.

The video encoder 500 comprises a temporal transform unit 510, a spatial transform unit 520, a quantization unit 530 and an entropy encoding unit 540. The temporal transform unit 510 may be further divided into a motion estimation unit 512, a motion compensation unit 514, a prediction frame generation unit 516 and a selection unit 518.

The motion estimation unit 512 conducts motion estimation of the current frame based on a reference frame, to thereby obtain a motion vector. In this exemplary embodiment, the motion is estimated by using two forward neighboring frames of the current frame as reference frames, and motion data such as a motion vector obtained as a result of conducting motion estimation, a size of a motion block and a reference frame number is supplied to the entropy encoding unit 540.

The motion compensation unit 514 conducts motion compensation for the two reference frames using the two motion vectors calculated by the motion estimation unit 512.

The prediction frame generation unit 516 generates temporal predication frames in three instances using the motion compensated reference frames supplied from the motion compensation unit 514, and supplies the three generated prediction frames to the selection unit 518.

The selection unit 518 selects the most advantageous prediction method among a prediction using only a forward reference frame (330 of FIG. 3), a prediction method using only a nearest already processed forward frame 350, and a prediction method using both frames 330 and 350. It is preferable that this selection be made in the unit of a macroblock. However, the unit is not limited to a macroblock, and may be extended to a frame or a slice. For this, the selection unit 518 is supplied with prediction frames from the prediction frame generation unit 516, which are generated by each prediction method, and the selection unit 518 selects the prediction frame whose cost according to Equation 1 is minimal.

The subtracter 519 subtracts the temporal prediction frame selected by the selection unit 518 from the current frame, to thereby eliminate temporal redundancy of a video.

Operations of the spatial transform unit 520, the quantization unit 530 and the entropy encoding unit 540 are the same as the elements illustrated in FIG. 4 having the same names, and thus, a repeated description thereof is omitted.

Figure 6:
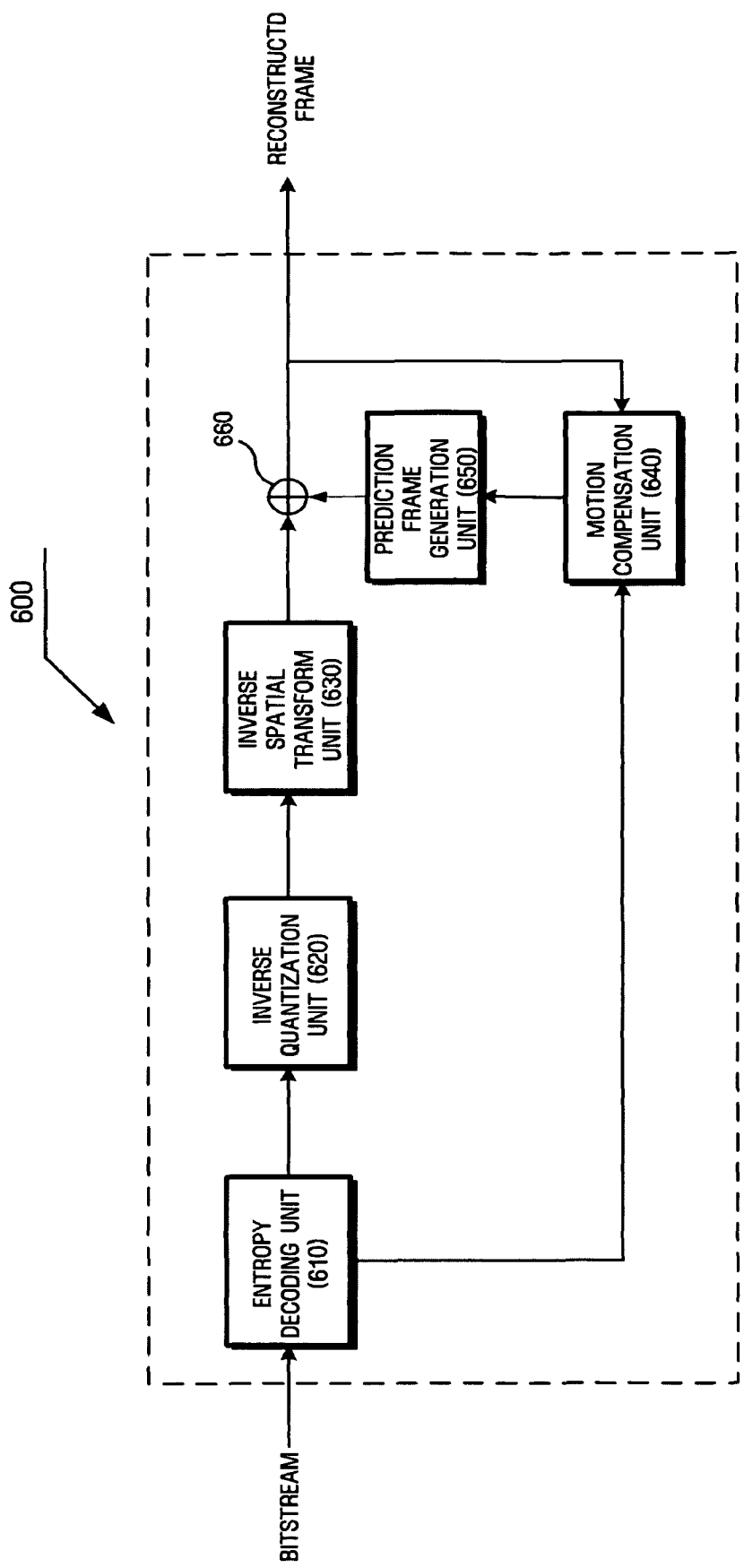
FIG. 6 is a block diagram illustrating a construction of a video decoder according to an exemplary embodiment of the present invention.

FIG. 6 is a block diagram illustrating a construction of a video decoder according to an exemplary embodiment of the present invention.

The video decoder 600 comprises an entropy decoding unit 610, an inverse quantization unit 620, an inverse spatial transform unit 630, a motion compensation unit 640 and a prediction frame generation unit 650.

The entropy decoding unit 610 conducts lossless decoding inversely to the entropy encoding and extracts motion data and texture data. The texture data is supplied to the inverse quantization unit 620 and the motion data is supplied to the motion compensation unit 640.

The inverse quantization unit 620 inversely quantizes the texture data transmitted by the entropy decoding unit 610. Inverse quantization is a process of searching for a quantized coefficient that matches the value (expressed as an index) transmitted by the encoders 400 and 500. A table indicating matching between indices and quantization coefficients may be transmitted by the encoders 400 and 500, or it may be set in advance by the encoder and the decoder.

The inverse spatial transform unit 630 inversely conducts spatial transformation, and reconstructs the coefficients generated as a result of the inverse quantization into a residual image in a spatial region. For example, in the case of spatial transformation by the wavelet method at the video encoder side, the inverse spatial transform unit 630 conducts an inverse wavelet transformation, but it will conduct an inverse DCT transformation in the case of spatial transformation by the DCT method at the video encoder side.

The motion compensation unit 640 conducts motion compensation for a reconstructed video frame using the motion data supplied from the entropy decoding unit 610, and generates a motion compensated frame. The motion compensation is only applied to the case where the current frame is encoded by the encoder side through a temporal prediction process.

The prediction frame generation unit 650 receives information on the motion compensated frame and the reference frame numbers supplied by the motion compensation unit 640, and on this basis generates a prediction frame corresponding to a frame to be reconstructed and supplies it to an adder 660.

When the residual image reconstructed by the inverse spatial transform unit has been generated through temporal prediction, the adder 660 adds the residual image and a prediction frame motion compensated and reconstructed, supplied from the prediction frame generation unit 650, and reconstructs a video frame.

Respective elements of FIGS. 4 to 6 are implemented as software or hardware such as a field-programmable gate array (FPGA) or an application-specific integrated circuit (ASIC). Also, they may reside in an addressable storage medium or they may be configured so as to be executed on one or more processors. The functions supplied by these elements may be implemented as subdivided elements, or a specific function may be executed by integrating a plurality of elements. In addition, these elements may be implemented to execute on one or more computers within a system.

Figure 7:
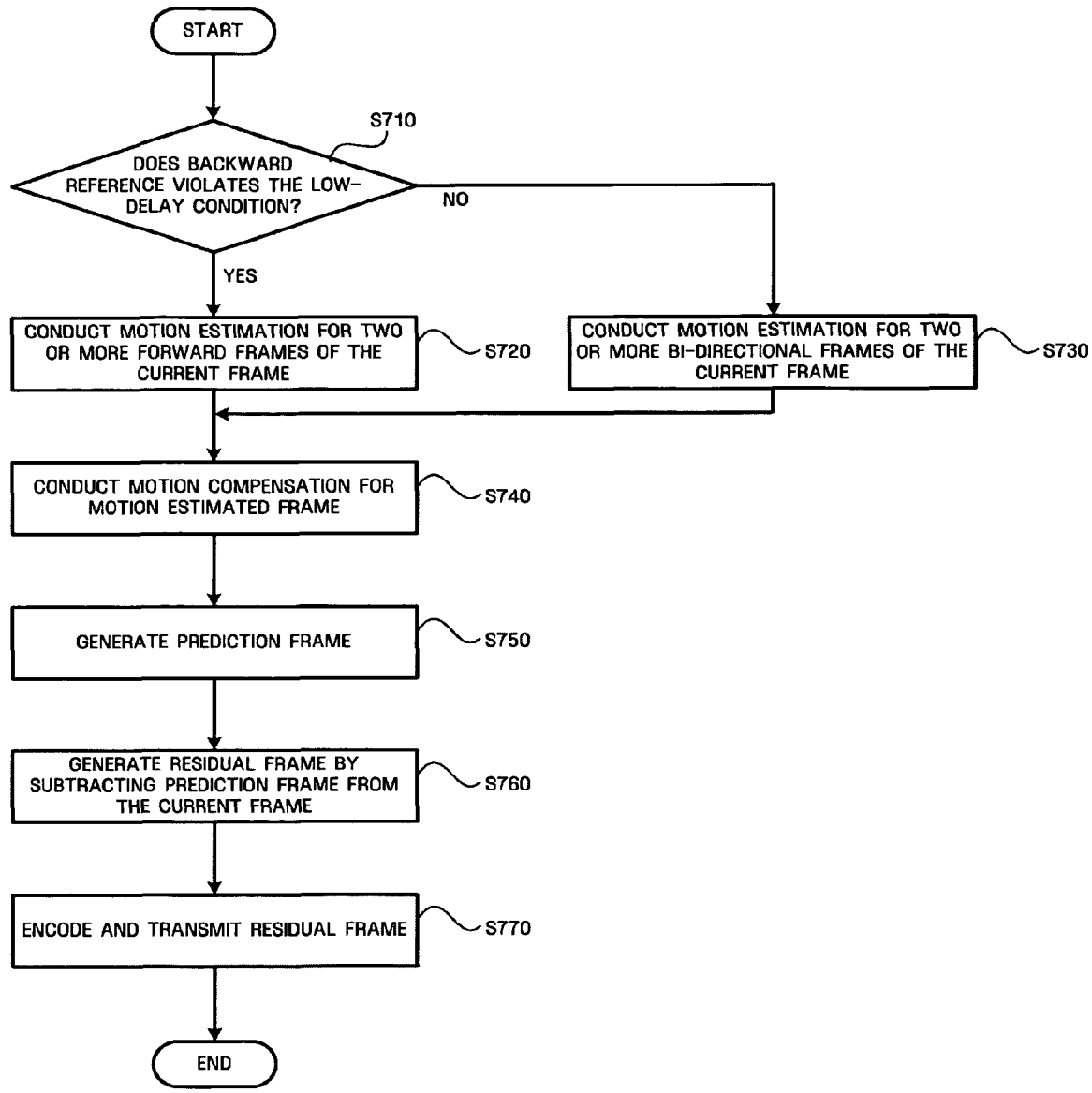
FIG. 7 is a flow chart showing video encoding in the encoder illustrated in FIG. 4.

FIG. 7 is a flow chart illustrating a video encoding operation at an encoder illustrated in FIG. 4.

The mode conversion unit 411 inspects whether the backward reference frame violates the low-delay condition. When the backward reference frame violates the low-delay condition ("Yes" in S710), the mode estimation unit 412 conducts motion estimation for a neighboring forward frame and an already processed frame, among the forward frames of the current frame, instead of the backward frame whose referencing is not permitted (S720). At this time, the number of the forward reference frames used instead of the backward reference frame may be larger than two (2). Alternatively, when the backward reference frame does not violate the low-delay condition ("No" of S710), the motion estimation unit 412 conducts motion estimation for a forward frame and a backward frame of the current frame as in the conventional manner (S730).

The motion compensation unit 414 conducts motion compensation for the reference frame using information about a motion generated as a result of conducting motion estimation, that is, a motion vector, a reference frame number and the like (S740). The prediction frame generation unit 416 generates a prediction frame for the current frame from the motion compensated reference frames (S750). The prediction frame is generally generated by using a weighted average of the reference frames. The weighted value of each reference frame may be the same as that described with reference to FIG. 4, or it may be inversely proportional to a temporal position distant from the current frame of each reference frame. That is, as the reference frame is more distant from the current frame, it is reflected less in the prediction.

When a residual signal is generated by subtracting the prediction frame from the current frame (S760), the residual signal is decoded through spatial transformation, quantization and entropy encoding and is transmitted to the decoder (S770).

Figure 8:
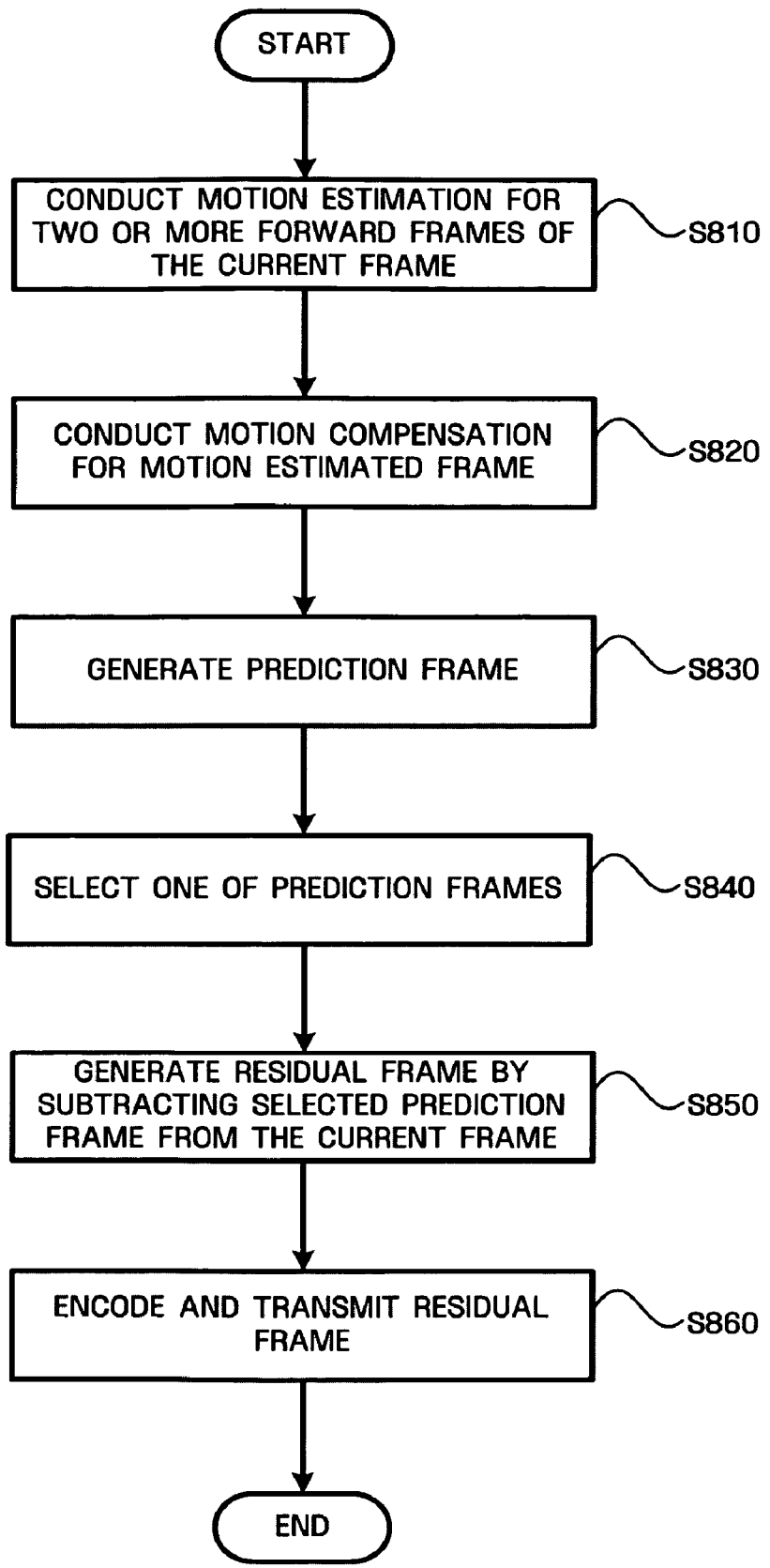
FIG. 8 is a flow chart showing video encoding in the encoder illustrated in FIG. 5.

FIG. 8 is a flow chart illustrating a video encoding operation in the encoder illustrated in FIG. 5.

The motion estimation unit 512 conducts motion estimation for two or more forward frames of the current frame (S810).

The motion compensation unit 514 conducts motion compensation for the reference frame using information on a motion generated as a result of conducting motion estimation, that is, a motion vector, a reference frame number and the like (S820). The prediction frame generation unit 516 generates a prediction frame for the current frame from the motion compensated reference frames (S830). The prediction frame in this exemplary embodiment covers a neighboring forward frame (F1) of the motion compensated current frame, an already processed frame (F2) as the forward frame for the motion compensated current frame, and a prediction frame (F3) generated by using an arithmetical mean of F1 and F2.

Among the prediction frames, F1, F2 and F3, the most appropriate prediction frame is selected by the selection unit 518 (S840), and a residual signal is generated by subtracting the selected prediction frame from the current frame (S850). The residual signal is encoded through spatial transformation, quantization and entropy encoding and is transmitted to the decoder (S860).

The present exemplary embodiment has been described under the assumption that two forward reference frames are used, but it should be obvious to those skilled in the art that prediction may also be conducted using more than two (2) forward reference frames. When more than two forward reference frames are used, a prediction frame advantageous for encoding will be used, among the motion compensated reference frames and prediction frames corresponding to an arithmetical mean of all possible combinations of the reference frames. Likewise, selection of the most advantageous method among the three prediction methods is the selection of a method to reduce the cost as much as possible by conducting direct encoding for each method.

As described above, video coding and decoding methods having the structure of hierarchical temporal filtering will produce at least one of the following effects.

First, even when the backward prediction path is not permitted under the low-delay condition, bi-directional prediction is available by using an already processed forward frame as a reference frame, instead of a missing backward reference frame.

Second, performance of the video coding can be enhanced by effectively increasing the number of frames by using an already processed forward frame as a reference frame.

Third, drift artifacts of a video encoder using an open loop method can be reduced by using temporally preceding frames as reference frames.

It should be understood by those of ordinary skill in the art that various replacements, modifications and changes may be made in the form and details without departing from the spirit and scope of the present invention as defined by the following claims. Therefore, it should be appreciated that the above described exemplary embodiments are for purposes of illustration only and are not to be construed as limitations of the invention.

What is claimed is:

1. A video decoding method in a temporal level having a hierarchical temporal filtering structure, the method comprising:
    extracting a reference frame number and texture data from a bitstream;
    inversely quantizing the texture data;
    restoring a residual frame by conducting inverse spatial transformation on the inversely quantized texture data;
    generating a prediction frame with a reference frame corresponding to the reference frame number; and
    restoring a video frame by adding the residual frame to the prediction frame,
    wherein the reference frame number refers to the numbers of at least two frames temporally preceding the video frame.

2. The method of claim 1, wherein the reference frame number refers to the numbers of the at least two frames temporally preceding the video frame if a backward reference path to the restored video frame violates low-delay condition.

3. The method of claim 1, wherein the reference frame number refers to the number of the reference frame used to generate the prediction frames, and
    the prediction frames refer to a frame determined by:
    generating the prediction frames by conducting motion compensation on a frame, among the at least two temporally preceding reference frames, or obtaining a weighted average of at least two motion compensated frames among the reference frames; and
    selecting the prediction frame having a lowest cost by encoding the respective prediction frames.

4. A video decoder in a temporal level having a hierarchical temporal filtering structure, the decoder comprising:
    an entropy decoding unit which extracts a reference frame number and texture data from a bitstream;

an inverse quantization unit which inversely quantizes the texture data;

an inverse spatial transform unit which reconstructs a residual frame by inversely conducting a spatial transformation on the inversely quantized texture data;

a motion compensation unit which conducts motion compensation on a frame corresponding to the reference frame number; and a prediction frame generation unit which generates a prediction frame from the motion compensated frame, wherein the reference frame number refers to numbers of at least two frames temporally preceding the video frame.

5. The video decoder of claim 4, wherein the reference frame number refers to the numbers of the at least two frames temporally preceding the video frame if the backward reference path to a restored video frame violates a low-delay condition.

6. The video decoder of claim 4, wherein the reference frame number refers to the number of the reference frame used to generate the prediction frame, and the prediction frame refers to a frame determined by:

generating the prediction frames by conducting motion compensation for a frame, among the at least two temporally preceding reference frames, or obtaining a weighted average of at least two motion compensated frames among the reference frames; and selecting a prediction frame having a lowest cost by encoding the respective prediction frames.

7. A medium recording a computer readable program to execute a video decoding method in a temporal level having a hierarchical temporal filtering structure, the method comprising:

extracting a reference frame number and texture data from a bitstream;

inversely quantizing the texture data;

restoring a residual frame by conducting inverse spatial transformation on the inversely quantized texture data;

generating a prediction frame with a reference frame corresponding to the reference frame number; and restoring a video frame by adding the residual frame to the prediction frame, wherein the reference frame number refers to the numbers of at least two frames temporally preceding the video frame.

* * * * *